US011646415B2

(12) United States Patent
Li et al.

(10) Patent No.: US 11,646,415 B2
(45) Date of Patent: May 9, 2023

(54) SECONDARY BATTERY, BATTERY MODULE, BATTERY PACK, APPARATUS CONTAINING THE SECONDARY BATTERY

(71) Applicant: Contemporary Amperex Technology Co., Limited, Ningde (CN)

(72) Inventors: Maohua Li, Ningde (CN); Chuanmiao Yan, Ningde (CN); Xin Sun, Ningde (CN)

(73) Assignee: Contemporary Amperex Technology Co., Limited, Ningde (CN)

(*) Notice: Subject to any disclaimer, the term of this patent is extended or adjusted under 35 U.S.C. 154(b) by 0 days.

(21) Appl. No.: 17/547,278

(22) Filed: Dec. 10, 2021

(65) Prior Publication Data

US 2022/0166018 A1 May 26, 2022

Related U.S. Application Data

(63) Continuation of application No. PCT/CN2020/113311, filed on Sep. 3, 2020.

(30) Foreign Application Priority Data

Sep. 26, 2019 (CN) .......................... 201910918750.X

(51) Int. Cl.
*H01M 4/525* (2010.01)
*H01M 4/133* (2010.01)
(Continued)

(52) U.S. Cl.
CPC ........... *H01M 4/525* (2013.01); *H01M 4/133* (2013.01); *H01M 4/134* (2013.01); *H01M 4/505* (2013.01);
(Continued)

(58) Field of Classification Search
CPC ...... H01M 4/525; H01M 4/133; H01M 4/134; H01M 4/505; H01M 4/622; H01M 4/625;
(Continued)

(56) References Cited

U.S. PATENT DOCUMENTS

2007/0218357 A1    9/2007  Takagi et al.
2012/0258365 A1*  10/2012  Yokoyama .............. C01G 51/42
                                                          429/223
(Continued)

FOREIGN PATENT DOCUMENTS

CN    103283083 A    9/2013
CN    107534142 A    1/2018
(Continued)

OTHER PUBLICATIONS

The Notice of Reexam for CN Application No. 201910918750.X, dated Mar. 4, 2022, 8 pages.
(Continued)

*Primary Examiner* — Cynthia K Walls
(74) *Attorney, Agent, or Firm* — East IP P.C.

(57) ABSTRACT

The present application discloses a secondary battery and a battery module, a battery pack and an apparatus containing the secondary battery. The secondary battery comprises a positive electrode plate, a negative electrode plate, a separator and an electrolyte; the positive electrode plate comprising a positive electrode current collector and a positive electrode film disposed on at least one surface of the positive electrode current collector and comprising a positive electrode active material; the negative electrode plate comprising a negative electrode current collector and a negative electrode film disposed on at least one surface of the negative electrode current collector and comprising a negative electrode active material; wherein the positive electrode active material comprises one or more of lithium nickel
(Continued)

cobalt manganese oxides and lithium nickel cobalt aluminium oxides; the negative electrode active material comprises a silicon-based material and a carbon material; and the secondary battery satisfies: $1.05 \leq K \leq 1.25$.

19 Claims, 2 Drawing Sheets

(51) Int. Cl.
*H01M 4/134* (2010.01)
*H01M 4/505* (2010.01)
*H01M 4/62* (2006.01)
*H01M 4/02* (2006.01)

(52) U.S. Cl.
CPC .......... *H01M 4/622* (2013.01); *H01M 4/625* (2013.01); *H01M 2004/021* (2013.01); *H01M 2004/027* (2013.01); *H01M 2004/028* (2013.01); *H01M 2220/20* (2013.01)

(58) Field of Classification Search
CPC ..... H01M 2004/021; H01M 2004/027; H01M 2004/028; H01M 2220/20
See application file for complete search history.

(56) References Cited

U.S. PATENT DOCUMENTS

| | | | | |
|---|---|---|---|---|
| 2013/0314051 | A1* | 11/2013 | Takezawa | H01M 10/44 320/134 |
| 2018/0241075 | A1* | 8/2018 | Ohara | H01M 4/131 |

FOREIGN PATENT DOCUMENTS

| | | |
|---|---|---|
| CN | 107636882 A | 1/2018 |
| CN | 107851838 A | 3/2018 |
| CN | 109509909 A | 3/2019 |
| CN | 109768278 A | 5/2019 |
| CN | 109962235 A | 7/2019 |
| CN | 109962236 A | 7/2019 |
| CN | 110061222 A | 7/2019 |
| CN | 110208716 A | 9/2019 |
| CN | 110212193 A | 9/2019 |
| CN | 110212247 A | 9/2019 |
| JP | 2010080196 A | 4/2010 |
| JP | 5117638 B2 | 1/2013 |
| JP | 2017033827 A | 2/2017 |
| KR | 20160010630 A | 1/2016 |
| KR | 20160064157 A | 6/2016 |
| KR | 20190066867 A | 6/2019 |
| WO | 2012124244 A1 | 9/2012 |
| WO | 2012137535 A1 | 10/2012 |

OTHER PUBLICATIONS

The International Search Report for PCT Application No. PCT/CN2020/113311, dated Dec. 9, 2020, 15 pages.
The First Office Action for Chinese Application No. 201910918750.X, dated Jul. 22, 2021, 9 pages.
The Rejection Decision for Chinese Application No. 201910918750.X, dated Sep. 17, 2021, 6 pages.
The First Office Action for IN Application No. 202217004515, dated Jun. 17, 2022, 7 pages.
The First Office Action dated Aug. 23, 2022 for Japanese Application No. 2022-507894 8 pages.
The First Office Action and search report dated Oct. 12, 2022 for Korean Application No. 10-2022-7005425, 13 pages.
The extended European search report dated Nov. 4, 2022 for European Application No. 20870255.5, 11 pages.
Iqbal Azhar et al: "Lithium-ion full cell with high energy density using nickel-rich LiNi0.8Co0.1Mn0.1O2 cathode and SiO-C composite anode", International Journal of Minerals, Metallurgy and Materials, vol. 25, No. 12, Dec. 6, 2018, pp. 1473-1481, XP036722661, 9 pages.

* cited by examiner

SECONDARY BATTERY, BATTERY MODULE, BATTERY PACK, APPARATUS CONTAINING THE SECONDARY BATTERY

CROSS-REFERENCE OF RELEVANT APPLICATION

The application is a continuation of International Application No. PCT/CN2020/113311, filed on Sep. 3, 2020, which claims priority of Chinese Patent Application No. 201910918750.X, which was filed on Sep. 26, 2019, both of which are incorporated herein by reference in their entireties.

TECHNICAL FIELD

The application belongs to the technical field of energy storage apparatus, in particular to secondary batteries, and battery modules, battery packs, apparatus containing the secondary batteries.

BACKGROUND

In recent years, the production and sales of new energy vehicles have increased rapidly, and major global auto groups are focusing on new energy vehicles. It can be predicted that the market for new energy vehicles will be expanded in the future. At present, a lithium ion secondary battery is most widely used in pure electric vehicles, plug-in hybrid electric vehicles and other models. Considering the service life of the vehicles, the battery life is a serious challenge. Therefore, how to further improve the cycle performance of batteries has become an important technical issue in the research and development of secondary batteries.

SUMMARY

The first aspect of this application provides a secondary battery comprising a negative electrode plate, a separator and an electrolyte, the positive electrode plate comprising a positive electrode current collector and a positive electrode film disposed on at least one surface of the positive electrode current collector and comprising a positive electrode active material; the negative electrode plate comprising a negative electrode current collector and a negative electrode film disposed on at least one surface of the negative electrode current collector and comprising a negative electrode active material;

the positive electrode active material comprising one or more of lithium nickel cobalt manganese oxides and lithium nickel cobalt aluminium oxides;

the negative electrode active material comprising a silicon-based material and a carbon material;

the secondary battery satisfying: $1.05 \leq K \leq 1.25$, wherein $K = (C_1/S_1 + C_2/S_2)/(C_1/S_1 + C_3/S_3)$, in which $C_1$ denotes a discharge capacity as obtained under the condition that the secondary battery is charged to 4.2V at 0.33 C, then charged at a constant voltage of 4.2V till a current is less than or equal to 0.05 C, set standing for 30 min and discharged to 2.5V at 0.33 C; $C_2$ denotes a deintercalting lithium capacity as measured by taking a negative electrode plate with an area of 52 from the secondary battery that has experienced the $C_1$ test, and then assembling it with a first lithium plate to form a first button battery, and having the negative electrode plate deintercalated at 0.1 C till the first button battery has a voltage of 0.7V; and $C_3$ denotes a intercalating lithium capacity as measured by taking a positive electrode plate with an area of $S_3$ from the secondary battery that has experienced the $C_1$ test, and then assembling it with a second lithium plate to form a second button battery, and having the positive electrode plate intercalated at 0.1 C till the second button battery has a voltage of 2.8V;

the $S_1$ is a total area of the positive electrode film in the secondary battery;

the $S_1$, the $S_2$ and the $S_3$ are in mm$^2$; and the $C_1$, the $C_2$ and the $C_3$ are in mAh.

In the secondary battery provided in this application, the positive electrode active materials include one or more of lithium nickel cobalt manganese oxide and lithium nickel cobalt aluminum oxide, and the negative electrode active materials include silicon-based materials and graphite and the secondary battery meets the performance parameter K in a specific range, which can make the secondary battery to have longer cycle life and better storage performance while having a higher energy density.

In any of above embodiments, $1.05 \leq K \leq 1.15$. The performance parameter K of the secondary battery being within the given range can better make the secondary battery to have higher energy density and better cycle performance, storage performance and dynamic performance.

In any of the above embodiments, a voltage $U_a$ between the negative electrode plate in the secondary battery that has experienced the $C_1$ test and the metal lithium plate satisfies: $0.35 \text{ V} \leq U_a \leq 0.65 \text{ V}$; optionally, $0.45 \text{ V} \leq U_a \leq 0.65 \text{ V}$. If satisfying the above conditions, the secondary battery can not only improve the cycle performance and storage performance, but also obtain higher energy density and dynamic performance.

In any of the above embodiments, a voltage $U_c$ between the positive electrode plate in the secondary battery that has experienced the $C_1$ test and the lithium metal plate satisfies: $U_c \leq 3.75 \text{ V}$; optionally, $3.551 \text{ V} \leq U_c \leq 3.75 \text{ V}$. If satisfying the above conditions, the secondary battery can obtain higher energy density.

In any of the above embodiments, the capacity excess coefficient of the secondary battery is from 1.1 to 1.35, optionally from 1.12 to 1.2. The capacity excess coefficient of the secondary battery being within in the range mentioned above will be helpful to improve the energy density and safety performance of the secondary battery while optimizing the K value.

In any of the above embodiments, the mass percentage ω of the silicon-based material in the negative electrode active material is 40% or less; optionally, $10\% \leq \omega \leq 30\%$. The proper mass percentage of the silicon-based materials in the negative electrode active materials can further improve the energy density and cycle performance of the secondary batteries.

In any of the above embodiments, the silicon-based material may include one or more of elemental silicon, silicone oxides, silicon-carbon compounds, silicon-nitrogen compounds and silicon alloys. Optionally, the silicon-based material comprises silicone oxides. The carbon material may include one or more of graphite, soft carbon and hard carbon. Optionally, the carbon material comprises graphite, which is one or more selected from artificial and natural graphite.

In any of the above embodiments, the lithium nickel cobalt manganese oxide is the lithium nickel cobalt manganese oxide is one or more selected from compound as shown in Formula 1 and surface-coated modified compounds thereof,

Formula 1, in the Formula 1, $0.8 \leq a \leq 1.2$, $0.5 \leq b < 1$, $0 < c < 1$, $0 < d < 1$, $0 \leq e \leq 0.1$, $1 \leq f \leq 2$, $0 \leq g \leq 1$, $M^1$ is one or more selected from Zr, Al, Zn, Cu, Cr, Mg, Fe, V, Ti and B, and A is one or more selected from N, F, S and Cl; or, the lithium nickel cobalt aluminium oxide is one or more selected from compound as shown in Formula 2 and surface-coated modified compounds thereof,

Formula 2, in the Formula 2, $0.8 \leq \alpha \leq 1.2$, $0.5 \leq \beta < 1$, $0 < \gamma < 1$, $0 < \delta < 1$, $0 \leq \varepsilon \leq 0.1$, $1 \leq v \leq 2$, $0 \leq \sigma \leq 1$, $M^2$ is one or more selected from Zr, Mn, Zn, Cu, Cr, Mg, Fe, V, Ti and B, and X is one or more selected from N, F, S and Cl.

In any of the above embodiments, at least a part of the positive electrode active material is a single crystal particle. Positive electrode active materials containing single crystal particles can further improve the cycle performance, storage performance and energy density of secondary batteries.

In any of the above embodiments, the volumetric mean particle size $D_v 50$ of the positive electrode active material is from 3 μm to 12 μm, optionally from 3 μm to 9 μm. The positive electrode active material having a proper $D_v 50$ can not only improve the dynamic performance, cycle performance and storage performance of the secondary battery, but also increase the energy density of the secondary battery.

In any of the above embodiments, the areal density $CW_a$ of the negative electrode film is from 0.05 mg/mm$^2$ to 0.1 mg/mm$^2$, optionally from 0.07 mg/mm$^2$ to 0.09 mg/mm$^2$, alternatively the areal density $CW_c$ of the positive electrode film is from 0.13 mg/mm$^2$ to 0.29 mg/mm$^2$, optionally from 0.18 mg/mm$^2$ to 0.22 mg/mm$^2$. The areal density of negative or positive electrode film is within the given range, which can improve the dynamic performance, cycle performance, storage performance and energy density of batteries.

In any of the above embodiments, the porosity $P_a$ of the negative electrode film is from 20% to 40%, optionally from 25% to 35%; alternatively, the porosity $P_c$ of the positive electrode film is from 20% to 35%, optionally from 23% to 33%. The porosity of the negative electrode film or positive electrode film is within the given range, which can improve the dynamic performance, cycle performance, storage performance and energy density of batteries.

In any of the above embodiments, the positive electrode active materials further include one or more of lithium nickel oxide, lithium manganese oxide, lithium iron phosphate, lithium manganese phosphate, lithium iron manganese phosphate, lithium cobalt oxide and its modified compounds.

In any of the above embodiments, the negative electrode active material constitutes from 90% to 98% by mass of the negative electrode film by mass, optionally from 92% to 96% by mass. The negative electrode active materials account for a higher percentage, which is helpful to increase the energy density of batteries.

In any of the above embodiments, the negative electrode film further includes a binder. The binder may include one or more of styrene-butadiene rubber, polyacrylic acid compounds and modified compounds thereof, polyacrylates and modified compounds thereof; optionally the binder comprises one or more of polyacrylic acid compounds and modified compounds thereof, polyacrylates compounds and modified compounds thereof. The negative electrode film comprising a suitable binder can further improve the cycle performance of batteries.

In some embodiments, the mass percentage of the binder in the negative electrode film is from 1% to 10%, optionally from 3% to 6%. The proper mass percentage of binder in negative electrode film can enable the battery to obtain higher cycle performance and energy density.

In any of the above embodiments, the negative electrode film further includes a conductive agent. The conductive agent may include one or more of conductive black (Super P) and carbon nanotubes (CNT). The negative electrode film having a suitable conductive agent can further improve the cycle performance and dynamic performance of batteries.

In some embodiments, the mass percentage of the conductive agent in the negative electrode film is from 1% to 5%, optionally from 1% to 3%. The proper mass percentage of the conductive agent in the negative electrode film can enable the battery to obtain higher cycle performance, dynamic performance and energy density.

The second aspect of this application provides a battery module comprising the secondary battery as described in this application.

The third aspect of this application provides a battery pack comprising the secondary battery or battery module as described in this application.

The fourth aspect of this application provides an apparatus which includes at least one of the secondary batteries, battery modules, or battery packs as described in this application.

The battery modules, battery packs and apparatus in this application can have the same or similar effect due to the use of the secondary batteries described in this application.

DESCRIPTION OF THE DRAWINGS

In order to explain the technical solutions of the embodiments of the present application more clearly, the following will briefly introduce the drawings that need to be used in the embodiments of the present application. Obviously, the drawings described below are only some embodiments of the present application. A person of ordinary skill in the art can obtain other drawings based on the drawings without creative work.

Figure 1:
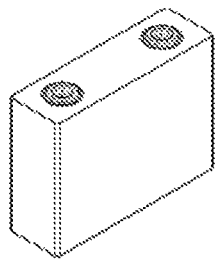
FIG. 1 is a schematic diagram of a secondary battery according to an embodiment of the present application.

Among them, the reference numbers of appended drawings indicate as follows:
1. Battery pack;
2. Upper box;
3. Lower box;
4. Battery module;
5. Secondary battery.

DETAILED DESCRIPTION

In order to make the objectives, technical solutions and beneficial technical effects of the present application clearer, the present application will be further described in detail below in conjunction with embodiments. It should be understood that the embodiments described in this specification are only for explaining the application, not intending to limit the application.

For the sake of brevity, only certain numerical ranges are explicitly disclosed herein. However, any lower limit may be combined with any upper limit to form a range that is not explicitly described; and any lower limit may be combined with other lower limits to form an unspecified range, and any upper limit may be combined with any other upper limit to form an unspecified range. Further, although not explicitly specified, each point or single value between the endpoints of the range is included in the range. Thus, each point or single value can be combined with any other point or single value as its own lower limit or upper limit or combined with other lower limit or upper limit to form a range that is not explicitly specified.

In the description herein, it should be noted that, unless otherwise specified, a numeric range described with the term "above" or "below" includes the lower or upper limit itself, and "more" in "one or more" means two or more.

In the description herein, unless otherwise stated, the term "or" is inclusive. For example, the phrase "A or B" means A, B, or both A and B". More specifically, either of the following conditions meets "A or B": A is true (or present) and B is false (or absent); A is false (or absent) and B is true (or present); or both A and B are true (or present).

The above summary of the present application is not intended to describe each disclosed embodiment or every implementation in this application. The following description illustrates exemplary embodiments more specifically. In many places throughout the application, guidance is provided through a series of examples, which can be used in various combinations. In each instance, the enumeration is only a representative group and should not be interpreted as exhaustive.

In lithium-ion secondary batteries, lithium ions swift back and forth between a positive electrode active material and a negative electrode active material for charging and discharging. Electrolyte is a carrier of lithium ion transmission for batteries. The positive electrode active material, negative electrode active material and electrolyte are important components of batteries, and they have an important influence on the cycle life of batteries. However, long-term research and evaluation are often required to improve the cycle performance of batteries from the aspects of the development and optimization of positive electrode active material, negative electrode active material and electrolyte. Based on these improvements to obtain batteries having higher cycle performance as well as higher capacity performance and dynamic performance for lithium ion deintercalation/intercalation, it would take a lot of time and resources. Moreover, material changes are usually accompanied by major changes in the raw materials, equipment, and processes of production. Therefore, it is very likely to cause a significant extension of the development cycle of secondary battery products and a sharp increase in the costs of development, so that it will be difficult to meet the explosive market demand for lithium-ion secondary batteries.

The inventor found through a lot of research that, from the point of view of battery design, on selecting a certain kind of positive and negative electrode active material, by controlling the performance parameter K in the given range, the battery can have a longer cycle life and better storage performance while having higher energy density.

Therefore, this application provides a secondary battery comprising a positive electrode plate, a negative electrode plate, a separator and an electrolyte. The positive electrode plate comprises a positive electrode current collector and a positive electrode film arranged on at least one surface of the positive electrode current collector and comprising a positive electrode active material and the positive electrode active material comprises one or more of lithium nickel cobalt manganese oxides and lithium nickel cobalt aluminium oxides. The negative electrode plate comprises a negative electrode current collector and a negative electrode film arranged on at least one surface of the negative electrode current collector and comprising a negative electrode active material. The negative electrode active material includes a silicon-based material and a carbon material.

For convenience, the performance parameter of the secondary battery is defined herein as K and $K=(C_1/S_1+C_2/S_2)/(C_1/S_1+C_3/S_3)$. The secondary battery in this application satisfies: $1.05 \leq K \leq 1.25$.

In the formula above, $C_1$ denotes a discharge capacity as obtained under the condition that the secondary battery is charged to 4.2V at 0.33 C, then charged at a constant voltage of 4.2V till a current is less than or equal to 0.05 C, set standing for 30 min and discharged to 2.5V at 0.33 C; $C_2$ denotes a lithium ion deintercalating capacity as measured by taking a negative electrode plate with an area of $S_2$ from the secondary battery that has experienced the $C_1$ test, then assembling it with a first lithium plate to form a first button battery, and having the negative electrode plate deintercalated at 0.1 C till the first button battery has a voltage of 0.7V; and $C_3$ denotes a lithium ion intercalating capacity as measured by taking a positive electrode plate with an area of $S_3$ from the secondary battery that has experienced the C1 test, then assembling it with a second lithium plate to form a second button battery, and having the positive electrode plate intercalated at 0.1 C till the second button battery has a voltage of 2.8V. The $C_1$, $C_2$ and $C_3$ are in mAh. The tests for $C_1$, $C_2$ and $C_3$ may be carried out at room temperature, such as 25° C.

$S_1$ is the total area of the positive electrode film in the secondary battery. The $S_1$, $S_2$ and $S_3$ are in mm$^2$.

It should be noted that the preparation process of the first button battery and the second button battery can refer to the national standard or industry specification. For example, a lithium metal plate considered as a counter electrode may be arranged in layers with a negative electrode plate of $S_2$ area or a positive electrode plate of $S_3$ area, and a conventional electrolyte in the industry can be added to prepare a first button battery or a second button battery.

As a specific example, the first button battery can be prepared in the following steps: in a glove box, disassemble the secondary battery that has experienced the $C_1$ test to get a negative electrode plate (if the negative electrode plate is a double-sided negative plate, then one of sides is erased); cut the negative electrode plate with a single-sided negative electrode film into a round plate with an area of $S_2$, then assemble it with a lithium metal plate as a counter electrode, and add an electrolyte, thereby obtaining a button battery. The electrolyte is obtained by dissolving fully dried lithium salt LiPF$_6$ and then adding fluorocarbon ethyl ester (FEC) in an organic solvent which is obtained by mixing ethyl carbonate (EC), ethyl methyl carbonate (EMC) and diethyl carbonate (DEC) in a volume ratio of 1:1:1, followed by mixing evenly; in the electrolyte, the concentration of LiPF$_6$ can be 1 mol/L, and the mass percentage of FEC in the electrolyte can be 6%.

The second button battery can be prepared according to the preparation method of the first button battery. In the electrolyte for the second button battery, fluorocarbon ethyl ester (FEC) can be added or not.

Through a lot of research by the inventor, it is found that when positive and negative electrodes include a specific type of active materials, and the performance parameter K of the secondary battery is controlled between 1.05 and 1.25, the positive and negative electrode plates can be effectively matched, so that the secondary battery has higher capacity performance and capacity retention during the storage and cycle, and the lithium ion and electron conductivity of the negative electrode plates also may be improved. Therefore, the secondary battery can have higher energy density, cycle performance, storage performance and dynamic performance.

The performance parameter K of the secondary battery is above 1.05, so that the number of Li ions that can be deintercalated from the negative electrode plate is more than the number of vacancies that can be intercalated into the positive electrode. As a result, the reversible capacity of the positive electrode plate can work sufficiently, so that the secondary battery can have higher energy density. Moreover, more lithium ions contained in the negative electrode plate can be used as an effective supplement to the lithium ions consumed in the storage and cycle of secondary batteries, thus greatly extending the cycle life and storage life of secondary batteries.

The larger the K value, the more lithium ions that can be deintercalated from the negative electrode plate than the vacancies where the lithium ions can be intercalated into the positive electrode plate is, so that the capacity retention rate of the battery during the storage and cycle may be improved and the cycle performance and storage performance of the battery would be better. When the performance parameter K of secondary batteries is below 1.25, under the condition that the same positive electrode plate design is used, the coating weight of the negative electrode plate is appropriate, so that the negative electrode plate has higher lithium ions conductivity and electrons conductivity, thereby obtaining secondary batteries having higher dynamic performance and higher fast charging ability. Moreover, the performance parameter K of the secondary battery is below 1.25, which can enable the secondary battery to have higher energy density.

In some embodiments, the K value of the secondary battery can be $\geq 1.05$, $\geq 1.08$, $\geq 1.10$, or $\geq 1.12$. And optionally, K is $\leq 1.25$, $\leq 1.20$, $\leq 1.18$, or $\leq 1.15$. Optionally, the performance parameter K value of secondary battery can be $1.05 \leq K \leq 1.20$, $1.05 \leq K \leq 1.15$, $1.05 \leq K \leq 1.10$, $1.05 \leq K \leq 1.08$, $1.06 \leq K \leq 1.15$, or $1.07 \leq K \leq 1.2$, and the like. The performance parameter K of the secondary battery being within the above range can better enable the secondary battery to have higher energy density and better cycle performance, storage performance and dynamic performance.

In the secondary battery of this application, it is possible to control the value of K within the range given in this application by one or more of prelithiating the positive electrode film, prelithiating negative electrode film, using a prelithiated silicon-based material, and adjusting capacity excess coefficient (i.e. CB value) of secondary batteries. The capacity excess coefficient of secondary batteries is a ratio of the negative electrode reversible capacity to the positive electrode reversible capacity in which the negative electrode plate and the positive electrode plate have the same area. In this application, the K value represents the ratio of the "number of active lithium" in the battery that can be used for intercalation and de-intercalation/the "number of vacancies" in the positive electrode that can be used for intercalation and de-intercalation. When the K value is greater than 1, it means that the battery has an additional part of "active lithium", which "active lithium" can be used to supplement the consumption of "active lithium" after the battery is aged, thereby extending battery life. In this application, CB value represents the ratio of the capacity of the negative electrode plate without pre-lithiation to the capacity of the positive electrode, which is related to the positive and negative electrode active materials of batteries. The larger the CB value, the more vacancies the negative electrode have for "lithium storage". That is, the potential for lithium storage is great. The more lithium is replenished, the more "active lithium" is stored in the battery, and the greater the K value is. In other words, the CB value represents "the potential of the battery capable of being replenished with lithium", or "the potential of how much the k value can be adjusted". Only when the CB is large, the ability to adjust the K value in a large range can be obtained. In addition, the larger the CB value, the more active lithium is consumed during negative electrode film formation. For batteries with a large CB value, if the lithium replenishment operation is not performed, the active lithium of the battery will be consumed more, the K value will be reduced, and the battery life will be short. That is, the K value is affected by the CB value.

In the secondary battery of this application, the prelithiation of the positive and negative electrode films can be carried out with the known technology in this field. For example, one or more of lithium powder, lithium tablets and lithium ingots may be used for the prelithiation of the negative electrode film, and the negative electrode film may also adopt directly the prelithiated silicon-based material.

In the secondary battery in this application, the capacity excess coefficient of secondary batteries can be from 1.1 to 1.35, further optionally from 1.12 to 1.32, from 1.12 to 1.2, or from 1.13 to 1.18. If the capacity excess coefficient of secondary batteries is in the range mentioned above, it is beneficial to perform the capacity of the secondary battery and to improve the energy density of the secondary battery in addition to optimizing the K value. In addition, it is beneficial to prevent lithium precipitation of the negative electrode film in the process of cycle and to improve the safety performance of the secondary battery.

In some embodiments, the voltage $U_a$ between the negative electrode plate in the secondary battery that has experienced the $C_1$ test and the metal lithium plate satisfies: $0.35 \text{ V} \leq U_a \leq 0.65 \text{ V}$. The first button battery can set standing 25° C. for 6 hours after assembling, and then the voltage of the first button battery is measured as to be $U_a$.

When the voltage $U_a$ between the negative electrode plate in the secondary battery that has experienced the $C_1$ test and the metal lithium plate $0.45 \leq U_a \leq 0.65$ V, the negative electrode plate of the secondary battery can store more lithium ions to supplement the lithium ions consumed during the storage and cycle of the secondary battery, so that the cycle performance and storage performance of the secondary battery are improved. In addition, $U_a$ of 0.65 V or less is also beneficial to reduce the volume effect of silicon-based materials so that the cycle performance of secondary batteries is further improved.

When $U_a$ is 0.35 V or more, the gram capacity of the negative electrode plate can work well, so that the secondary battery has a higher energy density. At the same time, this can also enable the secondary battery to have higher dynamic performance, such as higher fast charging capacity.

Optionally, the voltage $U_a$ between the negative electrode plate in the secondary battery has experienced the $C_1$ test and the metal lithium plate satisfies: $0.45 \text{ V} \leq U_a \leq 0.65 \text{ V}$. For example, $0.45 \text{ V} \leq U_a \leq 0.578 \text{ V}$, $0.45 \text{ V} \leq U_a \leq 0.542 \text{ V}$, $0.487 \text{ V} \leq U_a \leq 0.642 \text{ V}$, $0.487 \text{ V} \leq U_a \leq 0.578 \text{ V}$, $0.501 \text{ V} \leq U_a \leq 0.565 \text{ V}$, $0.518 \text{ V} \leq U_a \leq 0.578 \text{ V}$, or $0.45 \text{ V} \leq U_a \leq 0.501 \text{ V}$ and the like.

In the secondary battery of this application, it is possible to control $U_a$ in the range given in this application by one or more of prelithiating the negative electrode film, using prelithiated silicon-based materials, and adjusting the capacity excess coefficient (i.e. CB value) of secondary batteries.

In some embodiments, the voltage $U_c$ between the positive electrode plate in the secondary battery that has experienced the $C_1$ test and the metal lithium plate can meet: $U_c \leq 3.75$ V. The second button battery can be set standing 25° C. for 6 hours after assembling, and then the voltage of the second button battery is measured as to be $U_c$.

When the voltage $U_c$ between the positive electrode plate in the secondary battery that has experienced the $C_1$ test and the metal lithium plate is 3.75 V or less, the positive electrode plate has higher reversible capacity, thereby enabling the secondary battery to have higher energy density. Optionally, 3.551 V≤$U_c$≤3.75 V, 3.551 V≤$U_c$≤3.693 V, 3.551 V≤$U_c$≤3.639 V, 3.551 V≤$U_c$≤3.603 V, 3.551 V≤$U_c$≤3.566 V, 3.566 V≤$U_c$≤3.627 V, or 3.573 V≤$U_c$≤3.687 V.

The inventor also found that adjusting the areal density and/or porosity of the negative electrode film can further improve the energy density, cycle performance, storage performance and dynamic performance of the secondary battery when designing the secondary battery.

In some embodiments, the areal density $CW_a$ of negative electrode film is from 0.05 mg/mm$^2$ to 0.1 mg/mm$^2$, optionally from 0.07 mg/mm$^2$ to 0.09 mg/mm$^2$. A suitable areal density of negative electrode film can enable the negative electrode plate to have higher lithium ions and electrons conductivity, and also enable the negative electrode plate to have higher capacity elaboration. This is beneficial to improve the dynamic performance, cycle performance, storage performance and energy density of the battery.

In some embodiments, the porosity $P_a$ of negative electrode film is from 20% to 40%, optionally from 22% to 28%, from 25% to 35%, or from 25% to 30%. The porosity of the negative electrode film being appropriate can enable the materials in the negative electrode film to have good conductive contact, and enable the negative electrode film to have proper electrolyte infiltration quantity, which is beneficial to improve the dynamic performance, cycle performance, storage performance and energy density of the battery.

In the secondary battery in this application, optionally, the average volume diameter WO of positive electrode active materials is from 3 μm to 12 μm, further optionally from 3 μm to 9 μm, or from 4 μm to 8 μm. The $D_v50$ of positive electrode active material being appropriate can improve the transmission efficiency of lithium ions and electrons in positive electrode film, and reduce the side reaction of electrolyte in the positive electrode, so as to improve the dynamic performance, cycle performance and storage performance of secondary battery. In addition, when the WO of the positive electrode active material is in the above-mentioned range, it is beneficial to increasing the compaction density of the positive electrode film, and reducing the addition of binder in the positive electrode film, thereby increasing the energy density of the secondary battery.

In the secondary batteries in this application, optionally, at least part of the positive electrode active material is a single crystal particle. The positive electrode active material of single crystal particles can improve the compaction density and ductility of the whole positive electrode plate while reducing the contact area between the positive electrode active material and electrolyte, reducing the occurrence of the interface side reaction and reducing the gas production, thereby further improving the cycle performance, storage performance and energy density of the secondary battery.

In the secondary battery in this application, optionally, the areal density $CW_c$ of the positive electrode film is from 0.13 mg/mm$^2$ to 0.29 mg/mm$^2$, further optionally from 0.15 mg/mm$^2$ to 0.25 mg/mm$^2$, or from 0.18 mg/mm$^2$~0.22 mg/mm$^2$. The areal density of positive electrode film being appropriate can enable the positive electrode plate to have higher lithium ions and electrons conductivity, and also enable the positive electrode plate to have higher capacity elaboration, thereby being beneficial to improve the dynamic performance, cycle performance, storage performance and energy density of the battery.

In the secondary battery in this application, the porosity $P_c$ of positive electrode film is optionally from 20% to 35%, further optionally from 23% to 33%, or from 22% to 30%. The porosity of the positive electrode film being appropriate can enable the materials in the positive electrode film to have good electrical conductivity contact and also the positive electrode film to have appropriate electrolyte infiltration quantity, which is helpful to improve the dynamic performance, cycle performance, storage performance and energy density of the secondary battery. In addition, the positive electrode film has a higher compaction density, which can improve the energy density of secondary battery.

In the secondary battery in this application, the positive electrode film may be arranged on one surface of the positive electrode current collector, or two surfaces of the positive electrode current collector. The negative electrode film can be arranged on one surface of the negative electrode current collector or two surfaces of the negative electrode current collector at the same time.

It should be noted that when the positive and negative electrode plates are arranged on the two surfaces of the current collector, respectively, if the parameters of the positive or negative electrode film on either surface meet the requirements of this application, they will fall into the protection scope of this application. That is to say, the parameters of positive and negative electrode film given in this application refer to the parameters of the single-sided film.

In the secondary battery in this application, the silicon-based material may include one or more of elemental silicon, silicon oxides, silicon carbon compounds, silicon nitrogen compounds and silicon alloys. Optionally, the silicon-based material include silicon oxides of $SiO_x$, in which 0<x<2. Optionally 0.6≤x≤1.5. Optionally 0.9≤x≤1.2. The silicon oxides have higher capacity performance and cycle life.

In the secondary battery of this application, optionally, the mass percentage ω of silicon-based materials in negative electrode active materials is ≤40%. Optionally, 5%≤ω≤40%, 10%≤ω≤30%, 10%≤ω≤20%, 15%≤ω≤25%, or 20%≤ω≤35%. The mass percentage ω of silicon-based materials in negative electrode active materials being appropriate can further improve the energy density and cycle performance of secondary batteries.

In the secondary batteries of this application, the carbon material may include one or more of the graphite, soft carbon and hard carbon. Optionally, the carbon material includes graphite selected from one or more of artificial graphite and natural graphite.

In the secondary battery of this application, the mass percentage of the negative electrode active material in negative electrode film is optionally from 90% to 98%, optionally, from 92% to 96%, from 92% to 95%, or from 93% to 97%.

In the secondary battery of this application, the negative electrode film may optionally comprise a binder and/or a conductive agent.

The binder in the negative electrode film may be selected from any known binder for a negative electrode of a secondary battery in this field. Optionally, the binder in the negative electrode film may include one or more of styrene-butadiene rubber (SBR), polyacrylics compounds and modified compounds thereof, and polyacrylate salt compounds and modified compounds thereof. Optionally, the binder in the negative electrode film may include one or more of a polyacrylic acid compound and modified compounds thereof, and a polyacrylate compound and modified compounds thereof.

Optionally, the mass percentage of the binder in the negative electrode film has is from 1% to 10%, further optionally from 1% to 9%, desirably from 2% to 5%, from 3% to 6%, or from 4% to 8%.

The conductive agent in the negative electrode film can be selected from any known conductive agent used for the negative electrode of the secondary battery in this field. Optionally, the conductive agent in the negative electrode film includes one or more of conductive carbon black (Super P, abbreviated as SP) and carbon nanotubes (Carbon Nanotube, abbreviated as CNT).

Optionally, the mass percentage of the conductive agent in the negative electrode film is from 1% to 5%, further optionally from 1% to 3%, or from 2% to 4%.

In the secondary battery in this application, the negative electrode current collector may be made of a material with a good conductivity and mechanical strength, such as a copper foil, without limitation thereto. For example, the negative electrode current collector has two opposite surfaces in its thickness direction, and the negative collector film is arranged on either or both of the two surfaces.

In the secondary battery in this application, optionally, the lithium nickel cobalt manganese oxide is one or more selected from compound as shown in Formula 1 and surface-coated modified compounds thereof:

$$Li_aNi_bCo_cMn_dM^1_eO_fA_g \qquad \text{Formula 1}$$

In the Formula 1, $0.8 \leq a \leq 1.2$, $0.5 \leq b < 1$, $0 < c < 1$, $0 < d < 1$, $0 \leq e \leq 1$, $1 \leq f \leq 2$, $0 \leq g \leq 1$, $M^1$ is one or more selected from Zr, Al, Zn, Cu, Cr, Mg, Fe, V, Ti and B and A is one or more selected from N, F, S and Cl.

In the secondary battery in this application, optionally, the lithium nickel cobalt aluminum oxide is one or more selected from compound as shown in Formula 2 and surface-coated modified compounds thereof:

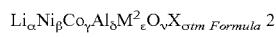
$$Li_\alpha Ni_\beta Co_\gamma Al_\delta M^2_\epsilon O_\nu X_{\sigma tm} \qquad \text{Formula 2}$$

In Formula 2, $0.8 \leq \alpha \leq 1.2$, $0.5 \leq \beta < 1$, $0 < \delta < 1$, $0 < \delta < 1$, $0 \leq \epsilon \leq 0.1$, $1 \leq v \leq 2$, $0 \leq \sigma \leq 1$, $M^2$ is one or more selected from Zr, Mn, Zn, Cu, Cr, Mg, Fe, V, Ti and B, and X is one or more selected from N, F, S and Cl.

The surface-coated modified compound may be obtained by disposing a coating layer on at least part of the surface of material particles. The coating layer may be a carbon layer, an oxide layer, an inorganic salt layer or a conductive polymer layer. The surface coating may further improve the cycle performance of secondary batteries.

Optionally, the carbon layer may include one or more of the graphite, graphene, mesocarbon microbeads (MCMB), hydrocarbon pyrolysis carbon, hard carbon and soft carbon.

Optionally, the oxide layer may include one or more of Al oxides, Ti oxides, Mn oxides, Zr oxides, Mg oxides, Zn oxides, Ba oxides, Mo oxides, and B oxides.

Optionally, the inorganic salt layer may include one or more of the $Li_2ZrO_3$, $LiNbO_3$, $Li_4Ti_5O_{12}$, $Li_2TiO_3$, $Li_3VO_4$, $LiSnO_3$, $Li_2SiO_3$ and $LiAlO_2$.

Optionally, the conductive polymer layer may include one or more of the polypyrrole (PPy), poly3, 4-ethylenedioxy-thiophene (PEDOT) and polyamide (PI).

In the secondary battery in this application, the positive electrode film may also include one or more of lithium nickel oxide, lithium manganese oxide (such as spinel lithium manganese oxide, and layered lithium manganese oxide), lithium iron phosphate, lithium manganese phosphate, lithium iron manganese phosphate, lithium cobalt oxide and modified compounds of the above materials. The modified compounds can be obtained by doping and/or coating the above mentioned material.

In the secondary battery of this application, the positive electrode film may optionally comprise a binder and/or a conductive agent. There is no specific restriction on the type of binder and conductive agent for the positive electrode film, and those skilled in the art may choose according to the actual demand.

In the secondary battery of this application, optionally, the mass percentage of the positive electrode active material in the negative electrode film is from 92% to 98%, further optionally from 94% to 97%, or from 95% to 98%.

In some embodiments, the binder in the positive electrode film may be one or more of the polyvinylidene fluoride (PVDF), polytetrafluoroethylene (PTFE), polyacrylic acid (PAA), polyvinyl alcohol (PVA), sodium carboxymethyl cellulose (CMC-Na), sodium alginate (SA), polymethylacrylic acid (PMAA) and carboxymethyl chitosan (CMCS).

In some embodiments, the mass percentage of the binder in positive electrode film is optionally from 0.5% to 5%, further optionally from 0.5% to 3%, or from 1.5% to 3.5%.

In some embodiments, the conductive agent in the positive electrode film may be one or more of graphite, super-conducting carbon, acetylene black, carbon black, Ketjen black, carbon dots, carbon nanotubes, graphene and carbon nanofibers.

In some embodiments, the mass percentage of the conductive agent in the positive electrode film is optionally from 0.5% to 4%, further from 0.5% to 2%, or from 1% to 3%.

In the secondary battery in this application, the positive electrode current collector may be made of a material with good conductivity and mechanical strength, such as an aluminum foil, without limitation thereto. For example, the positive electrode current collector has two opposite surfaces in its thickness direction, and the positive electrode film is arranged on either or both of those surfaces.

In the secondary battery in this application, the electrolyte comprises an organic solvent and a lithium salt dispersed in an the organic solvent. The specific type and composition of the organic solvent and lithium salt are not restricted, and they can be selected according to the actual demand.

As an example, the organic solvent may be one or more of ethylene carbonate (EC), propylene carbonate (PC), methyl ethyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), ethylene fluorocarbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1, 4-butyllactone (GBL), sulfolane (SF), dimethyl sulfone (MSM), methyl ethyl sulfone (EMS), and diethyl Sulfone (ESE).

As an example, the lithium salt can be selected from one or more of $LiPF_6$ (lithium hexafluorophosphate), $LiBF_4$ (lithium tetrafluoroborate), LiTFSI (lithium bistrifluoromethanesulfonimide) and LiTFS (lithium trifluoromethanesulfonate).

In the secondary battery of this application, the electrolyte may optionally include additives. There are no specific restrictions on the type of additives, and they can be selected according to demand. For example, the additives For example, the additives may include negative electrode film-forming additives, positive electrode film-forming additives, and additives that can improve some performances of the battery, such as additives that improve overcharge performance of the battery, additives that improve high-temperature performance of the battery, and additives that improve low-temperature performance of the battery.

In the secondary battery of this application, the separator is arranged between the positive electrode plate and the negative electrode plate to act as an isolation function. This application has no special restrictions on the type of separator, and it may be any known porous separator with good chemical stability and mechanical stability, such as one or more of glass fiber, non-woven fabric, polyethylene, polypropylene and polyvinylidene fluoride. The separator can be either a single-layer film or a multi-layer composite film. When the separator is a multi-layer composite film, the material of each layer can be the same or different.

The secondary battery of this application can be prepared according to the regular methods in this field. For example, a negative electrode active material and an optional conductive agent and binder can be dispersed in a solvent (e.g. water) to form a uniform negative electrode slurry, and the slurry can be coated on a negative electrode current collector, thereby obtaining a negative electrode plate after drying, cold pressing, and the like. A positive electrode active material and an optional conductive agent and binder are dispersed in a solvent (e.g. N-methyl pyrrolidone, abbreviated as NMP), to form a uniform positive electrode slurry, and the slurry can be coated on a positive electrode current collector, thereby obtaining positive electrode plate is obtained after drying, cold pressing and the like. The positive electrode plate, the separator and the negative electrode plate are wound or stacked sequentially, so that the separator is arranged between the positive electrode plate and the negative electrode plate for isolation, thereby obtaining a battery core. The battery core is placed into an outer package and the electrolyte is injected, thereby obtaining a secondary battery.

In the secondary battery of this application, the outer packing may be either a soft package (such as a bag, which may be made from plastic, such as one or more of the polypropylene PP, the polybutylene terephthalate PBT, polybutylene succinate PBS, and the like) or a hard shell (such as an aluminum shell).

The secondary battery in this application may adopt the battery core produced by the process of winding or laminating.

(1) In the case that winding technology is used:

① When a single surface of positive electrode current collector is coated, the total area of positive electrode film $S_1$=the total length of positive electrode film×the width of positive electrode film;

② When two surfaces of positive electrode current collector were coated, the total area of positive electrode film $S_1$=2×the total length of positive electrode film (single side)×the width of positive electrode film (single side);

(2) In the case that a laminating technology is used:

① When a single side of positive electrode current collector was coated, the total area of positive electrode film $S_1$=the length of the positive electrode plate×the width of the positive electrode plate×the number of the positive electrode plate.

② When two sides of positive electrode current collector were coated, the total area of positive electrode film $S_1$=2×the length of the positive electrode plate (one side)×the width of the positive electrode plate (one side)×the number of the positive electrode plate.

Figure 2:
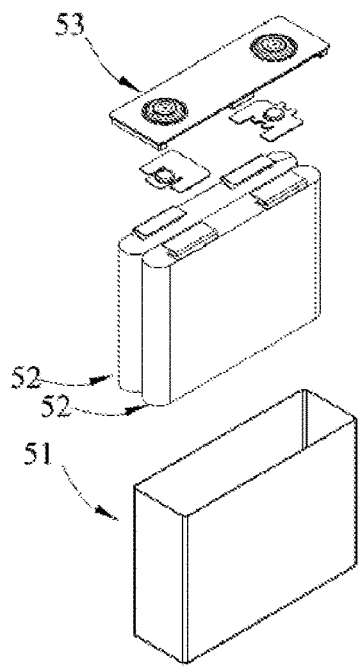
FIG. 2 is an exploded view of FIG. 1.

The present application does not have particular limitation to the shape of the secondary battery. The secondary battery may be cylindrical, square, or in other arbitrary shape. FIG. 1 shows a secondary battery 5 with a square structure as an example. Referring to FIG. 2, the outer package of secondary battery 5 may include a shell 51 and a cover plate 53. The shell 51 may include a bottom plate and side plates connected to the bottom plate, and the bottom plate and the side plates enclose a receiving cavity. The shell 51 has an opening communicated with the receiving cavity, and the cover plate 53 can cover the opening to close the receiving cavity. The battery core 52 is packaged in the receiving cavity. The electrolyte infiltrates the battery core 52. The secondary battery 5 may include one or more battery core 52, which can be adjusted according to requirements.

The second aspect of the present application provides a battery module comprising any one or more secondary batteries described in the first aspect of this application. The number of the secondary battery in the battery module can be adjusted according to the application and capacity of the battery module.

The battery module of the present application has higher energy density, cycle performance and storage performance by adopting the secondary battery according to the first aspect of the present application.

Figure 3:
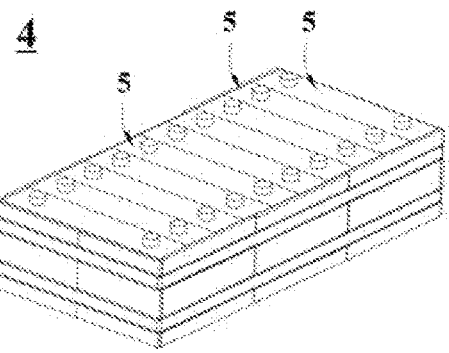
FIG. 3 is a schematic diagram of a battery module according to an embodiment of the present application.

In some embodiments, referring to FIG. 3, in the battery module 4, a plurality of secondary batteries 5 may be arranged sequentially in a length direction of the battery module 4. Of course, they may also be arranged in any other way. Further, a plurality of secondary batteries 5 may be fixed by fasteners.

Optionally, the battery module 4 may further include a housing having a receiving space, and a plurality of secondary batteries 5 are received in the receiving space.

The third aspect of the present application provides a battery pack comprising any one or more secondary batteries described in the first aspect of this application, or any or more battery module described in the second aspect of this application.

The battery pack of the present application has higher energy density, cycle performance and storage performance by adopting the secondary battery according to the first aspect of the present application.

The number of battery modules included in the battery pack can be adjusted according to the application and capacity of the battery pack.

Figure 4:
FIG. 4 is a schematic diagram of a battery pack according to an embodiment of the present application.
Figure 5:
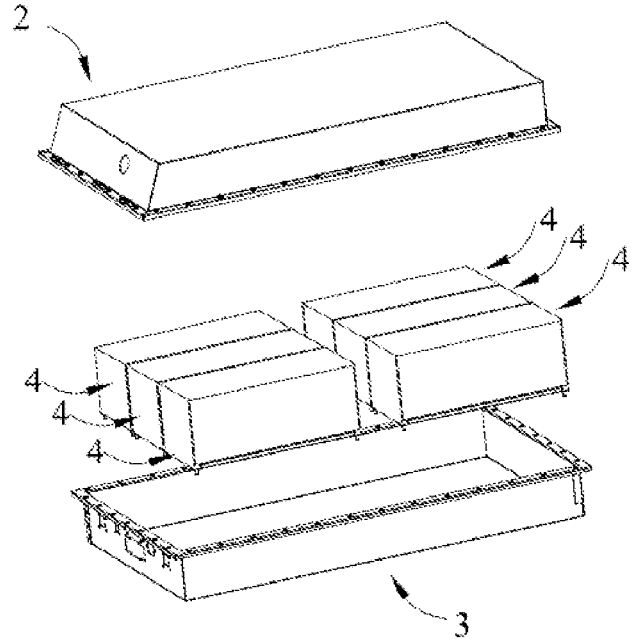
FIG. 5 is an exploded view of FIG. 4.

In some embodiments, referring to FIGS. 4 and 5, the battery pack 1 may include a battery case and a plurality of battery modules 4 disposed in the battery case. The battery case includes an upper case body 2 and a lower case body 3. The upper case body 2 can cover the lower case body 3 to form a closed space for receiving the battery modules 4. A plurality of battery modules 4 can be arranged in the battery case in any manner.

The fourth aspect of the present application provides an apparatus, the apparatus including at least one of the secondary battery, battery module and battery pack according to the present application. The secondary battery can be used as a power source of the apparatus, or as an energy storage unit of the apparatus. The apparatus may be, but is not limited to, a mobile device (e.g., a mobile phone, a notebook computer, and the like), an electric vehicle (e.g., a pure electric vehicle, a hybrid electric vehicle, a plug-in hybrid electric vehicle, an electric bicycle, an electric scooter, an electric golf vehicle, an electric truck and the like), an electric train, a ship, a satellite, an energy storage system, and the like.

Figure 6:
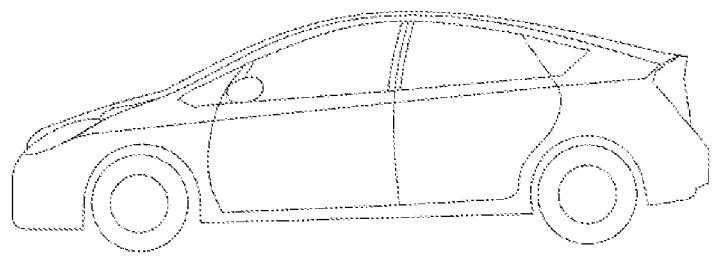
FIG. 6 is a schematic diagram of an apparatus according to an embodiment of the present application.

For example, FIG. 6 shows an apparatus as an example. The apparatus is a pure electric vehicle, a hybrid electric vehicle, or a plug-in hybrid electric vehicle, comprising at least one of the secondary battery, battery module and battery pack according to the present application. The secondary battery, battery module or battery pack according to the present application supplies power for the apparatus.

EXAMPLES

The following examples more specifically describe the content disclosed in the present application, and these examples are only used for explanatory description, because various modifications and changes within the scope of the present disclosure are obvious to those skilled in the art. Unless otherwise stated, all parts, percentages, and ratios described in the following examples are based on weight, all reagents used in the examples are commercially available or synthesized according to conventional methods and can be directly used without further treatment, and all instruments used in the examples are commercially available.

Example 1

1) Preparation of positive electrode plate

The positive electrode active material $LiNi_{0.8}Co_{0.1}Mn_{0.1}O_2$ (NCM811), the conductive agent Super P and the binder PVDF at a weight ratio of 94:3:3 were mixed with a proper amount of NMP, to form a positive electrode slurry, the positive electrode slurry was coated on the two surfaces of an aluminum foil as a positive electrode current collector, and the positive electrode plate was obtained after drying, cold pressing, cutting and piecing.

2) Preparation of negative electrode plate

First, SiO and the artificial graphite as a negative electrode active material were mixed at a weight ratio of 20:80 to obtain a mixed negative electrode active material, then the mixed negative electrode active material and the conductive agent Super P and the binder polyacrylate at a weight ratio of 93:2:5 were mixed with a proper amount of deionized water with stirring fully, thereby obtaining a uniform negative electrode slurry. The negative electrode slurry was coated on the two surfaces of a copper foil as a negative electrode current collector. After drying and cold pressing, the plate was subjected to prelithiation by pre-supplementing lithium so as to adjust the K and $U_a$ values of the battery. And then, after cutting and piecing, the negative electrode plate was obtained.

3) A polyethylene (PE) film was used as a separator.

4) Preparation of electrolyte

Ethylene carbonate (EC), ethyl methyl carbonate (EMC) and diethyl carbonate (DEC) were mixed in a volume ratio of 1:1:1 to obtain an organic solvent. A fully dried lithium salt $LiPF_6$ was dissolved in the organic solvent and fluoroethylene carbonate (FEC) as an additive was added. After mixing, the electrolyte was obtained. In the electrolyte, the concentration of $LiPF_6$ was 1 mol/L, and the mass percentage of FEC was 6%.

5) The positive electrode plate, the separator and the negative electrode plate were staked in order, and wound to obtain a battery core. The battery core was packed into an outer package, and the above electrolyte was added. After packaging, standing, forming, aging and other processes, a secondary battery was obtained.

The preparation methods of Examples 2~19 and Comparative Examples 1~4 were similar to that of Example 1 with the exception of the different product parameters as shown in Table 1.

Test Section

1. Performance Parameter K Value of Secondary Battery

At 25° C., the secondary batteries of examples and comparative examples were charged to 4.2 V with a constant current of 0.33 C, then charged to 0.05 C or less with a constant voltage of 4.2 V. After standing for 30 min, the secondary batteries were discharged to 2.5 V with a constant current of 0.33 C. At this time, the discharge capacity was recorded as $C_1$ in mAh. The total area of the positive electrode film in the secondary battery is denoted by $S_1$, and $S_1$=2×the total length of the positive electrode film×the width of the positive electrode film.

The negative electrode plate was taken from the secondary battery after the $C_1$ test, and the negative electrode film on one side was erased. The obtained negative electrode plate containing a single side negative electrode film was cut into a round plate with a diameter of 14 mm. A lithium metal round plate was used as a counter electrode. The negative electrode plate was opposite to the lithium metal plate with a PE separator disposed therebetween. The above-prepared electrolyte was added. The button battery was assembled in a glove box. After standing for 6 hours at 25° C., the voltage of the button battery was $U_a$. The button cell was charged with a constant current of 0.1 C so that the negative electrode plate was deintercalated until the voltage of the battery was 0.7V. At this time, the deintercalating lithium capacity $C_2$ was recorded in mAh. $S_2$ is the area of the negative electrode plate in the form of a round plate, which was 153.94 mm².

The positive electrode plate was taken from the secondary battery after the $C_1$ test, and the positive electrode film on one side was erased. The positive electrode plate containing the single side positive electrode film was cut into a round plate with a diameter of 14 mm. The lithium metal round plate was used as a counter electrode, and the positive electrode plate was opposite to the lithium metal plate with a PE separator disposed therebetween. The above-prepared electrolyte was added and the button battery was assembled in a glove box. After standing for 6 hours at 25° C., the voltage of the button battery was $U_c$. The button battery was discharged by a constant current of 0.1 C so that the positive electrode plate was intercalated until the voltage of the battery was 2.8 V. At this time, the intercalating lithium capacity $C_3$ was recorded in mAh. $S_3$ was the area of the positive electrode plate in the form of a round plate, i.e. 153.94 mm².

K value was calculated according to $K=(C_1/S_1+C_2/S_2)/(C_1/S_1+C_3/S_3)$.

2. Capacity Excess Coefficient of Secondary Battery

Negative reversible capacity: Take the negative electrode plate coated on one side and cut it into a round plate with a diameter of 14 mm. After weighing and deducting the mass of the negative current collector, the mass $M_a$ of the negative electrode film was obtained in mg. The button cell was assembled in a glove box, in which the lithium metal plate was used as a counter electrode and the above-prepared electrolyte was used. After standing for 6 hours at 25° C., the battery was discharged to 5 mV with a constant current of 0.1 C, and then discharged to 5 mV with a constant current of 0.01 C. After standing for 5 minutes, the battery was charged to 0.7 V at a constant current of 0.1 C. The charge capacity was marked as $C_a$ in mAh.

Positive reversible capacity: Take the positive electrode plate coated on one side and cut it into a round plate with a diameter of 14 mm. After weighing and deducting the mass of the positive electrode current collector, the mass $M_c$ of the positive electrode film was obtained in mg. The button cell was assembled in a glove box, in which the lithium metal plate was used as a counter electrode and the prepared electrolyte was used. After standing for 6 hours at 25° C., the battery was charged to 4.25 V at a constant current rate of 0.1 C, and then charged to 4.25 V at a constant current rate of 0.05 C. After standing for 5 minutes, the battery was discharged to 2.8 V at a constant current rate of 0.1 C. The discharge capacity was marked as $C_c$ in mAh.

Then the capacity excess coefficient CB of the battery was calculated according to $CB=C_a/C_c$.

3. Cyclic Life of Secondary Battery

At 25° C., the Lithium ion secondary battery prepared from the examples and Comparative examples were charged at 1 C and discharged at 1 C to perform a cycle test of full charge and full discharge, until the capacity of the Lithium ion secondary batteries was reduced to 80% of the initial capacity, and the number of cycles was recorded.

4. Storage Life of Secondary Battery

At 25° C., the lithium ion secondary batteries prepared in the examples and comparative examples were charged at 1 C and discharged at 1 C to obtain the initial capacity of the batteries. When the battery was fully charged at 1 C, it was stored in a thermostat oven at 60° C. until the capacity of the lithium ion secondary battery was reduced to 80% of the initial capacity. The days of storage was recorded.

5. Lithium Precipitation of Battery

At 25° C., the lithium ion secondary batteries prepared in the examples and comparative examples were fully charged at 1 C and fully discharged at 1 C for 10 cycles. Then the lithium-ion secondary batteries were fully charged at 1 C, and the negative electrode plates were taken out for observing the flatness of the negative electrode plate and the surface lithium precipitation. The negative electrode plate with lithium precipitation on the surface area of less than 5% was rated as to be slight lithium precipitation; the negative electrode plate with lithium precipitation on the surface area of from 5% to 40% was rated as to be medium lithium precipitation; and the negative electrode plate with lithium precipitation on the surface area of greater than 40% was rated as to be severe lithium precipitation.

Test results were shown in Tables 1 and 2.

TABLE 1

| | Positive electrode active material | Negative electrode active material | K | $U_a$ (V) | $U_c$ (V) | CB value | $CW_a$ mg/mm² |
|---|---|---|---|---|---|---|---|
| Example 1 | $LiNi_{0.8}Co_{0.1}Mn_{0.1}O_2$ | SiO + artificial graphite | 1.05 | 0.642 | 3.693 | 1.32 | 0.08 |
| Example 2 | $LiNi_{0.8}Co_{0.1}Mn_{0.1}O_2$ | SiO + artificial graphite | 1.07 | 0.603 | 3.665 | 1.32 | 0.08 |
| Example 3 | $LiNi_{0.8}Co_{0.1}Mn_{0.1}O_2$ | SiO + artificial graphite | 1.1 | 0.578 | 3.639 | 1.32 | 0.08 |
| Example 4 | $LiNi_{0.8}Co_{0.1}Mn_{0.1}O_2$ | SiO + artificial graphite | 1.12 | 0.565 | 3.627 | 1.32 | 0.08 |
| Example 5 | $LiNi_{0.8}Co_{0.1}Mn_{0.1}O_2$ | SiO + artificial graphite | 1.15 | 0.542 | 3.603 | 1.32 | 0.08 |
| Example 6 | $LiNi_{0.8}Co_{0.1}Mn_{0.1}O_2$ | SiO + artificial graphite | 1.2 | 0.518 | 3.573 | 1.32 | 0.08 |
| Example 7 | $LiNi_{0.8}Co_{0.1}Mn_{0.1}O_2$ | SiO + artificial graphite | 1.23 | 0.501 | 3.566 | 1.32 | 0.08 |
| Example 8 | $LiNi_{0.8}Co_{0.1}Mn_{0.1}O_2$ | SiO + artificial graphite | 1.25 | 0.487 | 3.551 | 1.32 | 0.08 |
| Example 9 | $LiNi_{0.85}Co_{0.15}Al_{0.05}O_2$ | SiO + artificial graphite | 1.05 | 0.641 | 3.699 | 1.32 | 0.08 |
| Example 10 | $LiNi_{0.85}Co_{0.15}Al_{0.05}O_2$ | SiO + artificial graphite | 1.15 | 0.555 | 3.616 | 1.32 | 0.08 |
| Example 11 | $LiNi_{0.85}Co_{0.15}Al_{0.05}O_2$ | SiO + artificial graphite | 1.25 | 0.492 | 3.556 | 1.32 | 0.08 |
| Example 12 | $LiNi_{0.8}Co_{0.1}Mn_{0.1}O_2$ | SiO + artificial graphite | 1.15 | 0.543 | 3.601 | 1.32 | 0.07 |
| Example 13 | $LiNi_{0.8}Co_{0.1}Mn_{0.1}O_2$ | SiO + artificial graphite | 1.15 | 0.545 | 3.605 | 1.32 | 0.075 |
| Example 14 | $LiNi_{0.8}Co_{0.1}Mn_{0.1}O_2$ | SiO + artificial graphite | 1.15 | 0.539 | 3.598 | 1.32 | 0.085 |
| Example 15 | $LiNi_{0.8}Co_{0.1}Mn_{0.1}O_2$ | SiO + artificial graphite | 1.15 | 0.545 | 3.606 | 1.32 | 0.09 |
| Example 16 | $LiNi_{0.8}Co_{0.1}Mn_{0.1}O_2$ | SiO + artificial graphite | 1.05 | 0.635 | 3.687 | 1.1 | 0.08 |
| Example 17 | $LiNi_{0.8}Co_{0.1}Mn_{0.1}O_2$ | SiO + artificial graphite | 1.07 | 0.596 | 3.645 | 1.12 | 0.08 |
| Example 18 | $LiNi_{0.8}Co_{0.1}Mn_{0.1}O_2$ | SiO + artificial graphite | 1.1 | 0.572 | 3.622 | 1.15 | 0.08 |
| Example 19 | $LiNi_{0.8}Co_{0.1}Mn_{0.1}O_2$ | SiO + artificial graphite | 1.15 | 0.534 | 3.583 | 1.2 | 0.08 |
| Comparative Example 1 | $LiNi_{0.8}Co_{0.1}Mn_{0.1}O_2$ | SiO + artificial graphite | 1.02 | 0.688 | 3.759 | 1.32 | 0.08 |
| Comparative Example 2 | $LiNi_{0.8}Co_{0.1}Mn_{0.1}O_2$ | SiO + artificial graphite | 1.3 | 0.435 | 3.527 | 1.32 | 0.08 |
| Comparative Example 3 | $LiNi_{0.85}Co_{0.15}Al_{0.05}O_2$ | SiO + artificial graphite | 1.02 | 0.693 | 3.762 | 1.32 | 0.08 |
| Comparative Example 4 | $LiNi_{0.85}Co_{0.15}Al_{0.05}O_2$ | SiO + artificial graphite | 1.3 | 0.438 | 3.53 | 1.32 | 0.08 |

TABLE 2

| No. | Cycle Life (number of cycles) | Storage Life (days) | Results of lithium Precipitation |
|---|---|---|---|
| Example 1 | 550 | 212 | No lithium precipitation |
| Example 2 | 583 | 236 | No lithium precipitation |
| Example 3 | 611 | 261 | No lithium precipitation |
| Example 4 | 649 | 285 | No lithium precipitation |
| Example 5 | 708 | 322 | No lithium precipitation |
| Example 6 | 766 | 365 | No lithium precipitation |
| Example 7 | 802 | 411 | No lithium precipitation |
| Example 8 | 865 | 450 | No lithium precipitation |
| Example 9 | 561 | 215 | No lithium precipitation |
| Example 10 | 720 | 327 | No lithium precipitation |
| Example 11 | 886 | 454 | No lithium precipitation |
| Example 12 | 705 | 320 | No lithium precipitation |
| Example 13 | 700 | 318 | No lithium precipitation |
| Example 14 | 711 | 323 | No lithium precipitation |
| Example 15 | 709 | 315 | No lithium precipitation |
| Example 16 | 541 | 210 | No lithium precipitation |
| Example 17 | 576 | 231 | No lithium precipitation |
| Example 18 | 605 | 256 | No lithium precipitation |
| Example 19 | 701 | 313 | No lithium precipitation |
| Comparative Example 1 | 478 | 170 | No lithium precipitation |
| Comparative Example 2 | 142 | 91 | Serious lithium precipitation |
| Comparative Example 3 | 483 | 172 | No lithium precipitation |

TABLE 2-continued

| No. | Cycle Life (number of cycles) | Storage Life (days) | Results of lithium Precipitation |
|---|---|---|---|
| Comparative Example 4 | 136 | 85 | Serious lithium precipitation |

By comparing Examples 1 to 8 and 12 to 19 with Comparative Examples 1 to 2, and comparing Examples 9 to 11 with Comparative Examples 3 to 4, it can be seen that when the positive and negative electrode plates include specific active materials and the performance parameter K of the secondary battery was controlled within the range of from 1.05 to 1.25, the battery had good cycle life, storage performance and dynamic performance.

In Comparative Examples 1 to 4, the K value was not within the given range and the corresponding battery failed to satisfy the cycle life, storage life and dynamic performance simultaneously.

Below are some exemplary embodiments of the present application.

Embodiment 1. A secondary battery, comprising a positive electrode plate, a negative electrode plate, a separator and an electrolyte, the positive electrode plate comprising a positive electrode current collector and a positive electrode film disposed on at least one surface of the positive electrode current collector and comprising a positive electrode active material; the negative electrode plate comprising a negative electrode current collector and a negative electrode film disposed on at least one surface of the negative electrode current collector and comprising a negative electrode active material;

wherein
the positive electrode active material comprises one or more of lithium nickel cobalt manganese oxides and lithium nickel cobalt aluminium oxides;
the negative electrode active material comprises a silicon-based material and a carbon material;
the secondary battery satisfies: $1.05 \leq K \leq 1.25$,
wherein $K=(C_1/S_1+C_2/S_2)/(C_1/S_1+C_3/S_3)$, in which $C_1$ denotes a discharge capacity as obtained under the condition that the secondary battery is charged to 4.2V at 0.33 C, then charged at a constant voltage of 4.2V till a current is less than or equal to 0.05 C, set standing for 30 min and discharged to 2.5V at 0.33 C; $C_2$ denotes a lithium ion deintercalating capacity as measured by taking a negative electrode plate with an area of $S_2$ from the secondary battery that has experienced the $C_1$ test, and then assembling it with a first lithium plate to form a first button battery, and having the negative electrode plate deintercalated at 0.1 C till the first button battery has a voltage of 0.7V; and $C_3$ denotes a lithium ion intercalating capacity as measured by taking a positive electrode plate with an area of $S_3$ from the secondary battery that has experienced the C1 test, and then assembling it with a second lithium plate to form a second button battery, and having the positive electrode plate intercalated at 0.1 C till the second button battery has a voltage of 2.8V the $S_1$ is a total area of the positive electrode film in the secondary battery;
the $S_1$, the $S_2$ and the $S_3$ are in mm²; and
the $C_1$, the $C_2$ and the $C_3$ are in mAh.

Embodiment 2. The secondary battery according to Embodiment 1, wherein $1.05 \leq K \leq 1.15$.

Embodiment 3. The secondary battery according to Embodiment 1 or 2, wherein a voltage $U_a$, between the negative electrode plate in the secondary battery that has experienced the $C_1$ test and the first lithium plate satisfies $0.35V \leq U_a \leq 0.65V$, optionally $0.45V \leq U_a \leq 0.65V$; or, a voltage $U_c$, between the positive electrode plate in the secondary battery that has experienced the C1 test and the second lithium plate, satisfies: $U_c \leq 3.75$, optionally, $3.551V \leq U_c \leq 3.75V$.

Embodiment 4. The secondary battery according to any one of Embodiments 1-3, wherein the secondary battery has a capacity excess coefficient of from 1.1 to 1.35, optionally from 1.12 to 1.2.

Embodiment 5. The secondary battery according to any one of Embodiments 1-4, wherein a mass percentage of the silicon-based material in the negative electrode active material satisfies $\omega \leq 40\%$, optionally $10\% \leq \omega \leq 30\%$.

Embodiment 6. The secondary battery according to any one of Embodiments 1-5, wherein
the silicon-based material comprises one or more of elemental silicon, silicon oxides, silicon-carbon compounds, silicon-nitrogen compounds and silicon alloys, optionally, the silicon-based material comprises silicon oxides;
the carbon material comprises one or more of graphite, soft carbon and hard carbon, and optionally, the carbon material comprises graphite and the graphite is one or more selected from artificial graphite and natural graphite.

Embodiment 7. The secondary battery according to any one of Embodiments 1-6, wherein
the lithium nickel cobalt manganese oxide is one or more selected from compound as shown in Formula 1 and surface-coated modified compounds thereof, $$Li_aNi_bCo_cMn_dM^1_eO_fA_g \quad \text{Formula 1,}$$ 

in the Formula 1, $0.8 \leq a \leq 1.2$, $0.5 \leq b < 1$, $0 < c < 1$, $0 < d < 1$, $0 \leq e \leq 0.1$, $1 \leq f \leq 2$, $0 \leq g \leq 1$, $M^1$ is one or more selected from Zr, Al, Zn, Cu, Cr, Mg, Fe, V, Ti and B, and A is one or more selected from N, F, S and Cl; or,
the lithium nickel cobalt aluminium oxide is one or more selected from compound as shown in Formula 2 and surface-coated modified compounds thereof, $$Li_\alpha Ni_\beta Co_\gamma Al_\delta M^2_\varepsilon O_\nu X_{\sigma} \quad \text{Formula 2,}$$ 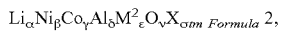

in the Formula 2, $0.8 \leq \alpha \leq 1.2$, $0.5 \leq \beta < 1$, $0 < \gamma < 1$, $0 < \delta < 1$, $0 \leq \varepsilon \leq 0.1$, $1 \leq \nu \leq 2$, $0 \leq \sigma \leq 1$, $M^2$ is one or more selected from Zr, Mn, Zn, Cu, Cr, Mg, Fe, V, Ti and B, and X is one or more selected from N, F, S and Cl.

Embodiment 8. The secondary battery according to any one of Embodiments 1-7, wherein at least a part of the positive electrode active material comprises single crystal particles.

Embodiment 9. The secondary battery according to any one of Embodiments 1-8, wherein the positive electrode active material has a volumetric mean particle size $D_v50$ of from 3 μm to 12 μm, optionally from 3 μm to 9 μm.

Embodiment 10. The secondary battery according to any one of Embodiments 1-9, wherein
the negative electrode film has an areal density $CW_a$ of from 0.05 mg/mm² to 0.1 mg/mm², optionally from 0.07 mg/mm² to 0.09 mg/mm²; or,
the positive electrode film has an areal density $CW_c$ of from 0.13 mg/mm² to 0.29 mg/mm², optionally from 0.18 mg/mm² to 0.22 mg/mm².

Embodiment 11. The secondary battery according to any one of Embodiments 1-10, wherein
the negative electrode film has a porosity $P_a$ of from 20%-40%, preferably from 25% to 35%; or, the positive electrode film has a porosity $P_c$ of from 20% to 35%, optionally from 23% to 33%.

Embodiment 12. The secondary battery according to any one of Embodiments 1-11, wherein the positive electrode active material further comprises one or more of lithium nickel oxides, lithium manganese oxides, lithium iron phosphate, lithium manganese phosphate, lithium manganese iron phosphate, lithium cobalt oxides and modified compounds thereof.

Embodiment 13. The secondary battery according to any one of Embodiments 1-12, wherein the negative electrode active material constitutes from 90% to 98% by mass of the negative electrode film by mass, optionally from 92% to 96% by mass.

Embodiment 14. The secondary battery according to any one of Embodiments 1-13, wherein the negative electrode film further comprises a binder that comprises one or more of butadiene styrene rubber, polyacrylic acid compounds and modified compounds thereof, and polyacrylate compounds and modified compounds thereof; and optionally, the binder comprises one or more of polyacrylic acid compounds and modified compounds thereof, and polyacrylate compounds and modified compounds thereof.

Embodiment 15. The secondary battery according to Embodiment 14, wherein the binder constitutes from 1% to 10% by mass, optionally from 3% to 6% by mass of the negative electrode film.

Embodiment 16. The secondary battery according to any one of Embodiments 1-15, wherein the negative electrode film further comprises a conductive agent that comprises one or more of conductive black (SuperP) and carbon nano tube (CNT).

Embodiment 17. The secondary battery according to Embodiment 16, wherein the conductive agent constitutes from 1% to 5% by mass, optionally from 1% to 3% by mass of the negative electrode film.

Embodiment 18. A battery module, comprising the secondary battery according to any one of Embodiments 1-17.

Embodiment 19. A battery pack, comprising the battery module according to Embodiment 18.

Embodiment 20. An apparatus, comprising at least one of the secondary battery according to any one of Embodiments 1-17, the battery module according to Embodiment 18, or the battery pack according to Embodiment 19.

Described above are merely specific embodiments of the present application, but the protection scope of the present application is not limited to this. Any skilled person who is familiar with this art could readily conceive of various equivalent modifications or substitutions within the disclosed technical scope of the present application, and these modifications or substitutions shall fall within the protection scope of the present application. Therefore, the protection scope of the present application shall be subject to the protection scope of the claims.

What is claimed is:

1. A secondary battery, comprising a positive electrode plate, a negative electrode plate, a separator and an electrolyte, the positive electrode plate comprising a positive electrode current collector and a positive electrode film disposed on at least one surface of the positive electrode current collector and comprising a positive electrode active material; the negative electrode plate comprising a negative electrode current collector and a negative electrode film disposed on at least one surface of the negative electrode current collector and comprising a negative electrode active material;

wherein
the positive electrode active material comprises one or more of lithium nickel cobalt manganese oxides and lithium nickel cobalt aluminum oxides;
the negative electrode active material comprises a silicon-based material and a carbon material;
the secondary battery satisfies: $1.05 \leq K \leq 1.25$,
wherein $K=(C_1/S_1+C_2/S_2)/(C_1/S_1+C_3/S_3)$,
in which $C_1$ denotes a discharge capacity as obtained under the condition that the secondary battery is charged to 4.2V at 0.33 C, then charged at a constant voltage of 4.2V till a current is less than or equal to 0.05 C, set standing for 30 min and discharged to 2.5V at 0.33 C; $C_2$ denotes a lithium ion deintercalating capacity as measured by taking the negative electrode plate with an area of $S_2$ from the secondary battery that has experienced the $C_1$ test, and then assembling it with a first lithium plate to form a first button battery, and having the negative electrode plate deintercalated at 0.1 C till the first button battery has a voltage of 0.7V; and $C_3$ denotes a lithium ion intercalating capacity as measured by taking the positive electrode plate with an area of $S_3$ from the secondary battery that has experienced the $C_1$ test, and then assembling it with a second lithium plate to form a second button battery, and having the positive electrode plate intercalated at 0.1 C till the second button battery has a voltage of 2.8V
the $S_1$ is a total area of the positive electrode film in the secondary battery;
the $S_1$, the $S_2$ and the $S_3$ are in mm$^2$; and
the $C_1$, the $C_2$ and the $C_3$ are in mAh,
wherein the silicon-based material comprises one or more of elemental silicon, silicon oxides, silicon-carbon compounds, silicon-nitrogen compounds and silicon alloys;
the carbon material comprises one or more of graphite, soft carbon and hard carbon,
wherein the lithium nickel cobalt manganese oxide is one or more selected from compound as shown in Formula 1 and surface-coated modified compounds thereof,

$$Li_aNi_bCo_cMn_dM^1_eO_fA_g \qquad \text{Formula 1,}$$

in the Formula 1, $0.8<a<1.2$, $0.5<b<1$, $0<c<1$, $0<d<1$, $0<e<0.1$, $1<f<2$, $0<g<1$, $M^1$ is one or more selected from Zr, Al, Zn, Cu, Cr, Mg, Fe, V, Ti and B, and A is one or more selected from N, F, S and Cl; or,
the lithium nickel cobalt aluminum oxide is one or more selected from compound as shown in Formula 2 and surface-coated modified compounds thereof,

$$Li_\alpha Ni_\beta Co_\gamma Al_\delta M^2_\varepsilon O_\nu X_\sigma \qquad \text{Formula 2,}$$

in the Formula 2, $0.8<\alpha<1.2$, $0.5<\beta<1$, $0<\gamma<1$, $0<\delta<1$, $0<\varepsilon<0.1$, $1<\nu<2$, $0<\sigma<1$, $M^2$ is one or more selected from Zr, Mn, Zn, Cu, Cr, Mg, Fe, V, Ti and B, and X is one or more selected from N, F, S and Cl.

2. The secondary battery according to claim 1, wherein $1.05 \leq K \leq 1.15$.

3. The secondary battery according to claim 1, wherein a voltage $U_a$, between the negative electrode plate in the secondary battery that has experienced the $C_1$ test and the lithium plate satisfies $0.35V \leq U_a \leq 0.65$; or,
a voltage $U_c$, between the positive electrode plate in the secondary battery that has experienced the $C_1$ test and the lithium plate, satisfies: $U_c \leq 3.75$.

4. The secondary battery according to claim 1, wherein the secondary battery has a capacity excess coefficient of from 1.1 to 1.35.

5. The secondary battery according to claim 1, wherein a mass percentage of the silicon-based material in the negative electrode active material satisfies $\omega \leq 40\%$.

6. The secondary battery according to claim 1, wherein
the silicon-based material comprises one or more of elemental silicon, silicon oxides, silicon-carbon compounds, silicon-nitrogen compounds and silicon alloys, optionally, the silicon-based material comprises silicon oxides;
the carbon material comprises one or more of graphite, soft carbon and hard carbon, and optionally, the carbon material comprises graphite and the graphite is one or more selected from artificial graphite and natural graphite.

7. The secondary battery according to claim 1, wherein
the lithium nickel cobalt manganese oxide is one or more selected from compound as shown in Formula 1 and surface-coated modified compounds thereof, $$Li_a Ni_b Co_c Mn_d M^1_e O_f A_g \qquad \text{Formula 1,}$$

in the Formula 1, $0.8 \leq a \leq 1.2$, $0.5 \leq b < 1$, $0 < c < 1$, $0 < d < 1$, $0 \leq e \leq 0.1$, $1 \leq f \leq 2$, $0 \leq g \leq 1$, $M^1$ is one or more selected from Zr, Al, Zn, Cu, Cr, Mg, Fe, V, Ti and B, and A is one or more selected from N, F, S and Cl; or,
the lithium nickel cobalt aluminium oxide is one or more selected from compound as shown in Formula 2 and surface-coated modified compounds thereof, $$Li_\alpha Ni_\beta Co_\gamma Al_\delta M^2_\varepsilon O_\nu X_\sigma \qquad \text{Formula 2,}$$

in the Formula 2, $0.8 \leq \alpha \leq 1.2$, $0.5 \leq \beta < 1$, $0 < \gamma < 1$, $0 < \delta < 1$, $0 < \varepsilon < 0.1$, $1 \leq \nu \leq 2$, $0 \leq \omega \leq 1$, $M^2$ is one or more selected from Zr, Mn, Zn, Cu, Cr, Mg, Fe, V, Ti and B, and X is one or more selected from N, F, S and Cl.

8. The secondary battery according to any claim 1, wherein at least a part of the positive electrode active material comprises single crystal particles.

9. The secondary battery according to claim 1, wherein the positive electrode active material has a volumetric mean particle size Dv50 of from 3 μm to 12 μm.

10. The secondary battery according to claim 1, wherein
the negative electrode film has an areal density $CW_a$ of from 0.05 mg/mm² to 0.1 mg/mm²; or,
the positive electrode film has an areal density $CW_S$ of from 0.13 mg/mm² to 0.29 mg/mm².

11. The secondary battery according to claim 1, wherein the negative electrode film has a porosity $P_a$ of from 20%-40%; or, the positive electrode film has a porosity $P_c$ of from 20% to 35%.

12. The secondary battery according to claim 1, wherein the positive electrode active material further comprises one or more of lithium nickel oxides, lithium manganese oxides, lithium iron phosphate, lithium manganese phosphate, lithium manganese iron phosphate, lithium cobalt oxides and modified compounds thereof.

13. The secondary battery according to claim 1, wherein the negative electrode active material constitutes from 90% to 98% by mass of the negative electrode film by mass.

14. The secondary battery according to claim 1, wherein the negative electrode film further comprises a binder that comprises one or more of butadiene styrene rubber, polyacrylic acid compounds and modified compounds thereof, and polyacrylate compounds and modified compounds thereof; and optionally, the binder comprises one or more of polyacrylic acid compounds and modified compounds thereof, and polyacrylate compounds and modified compounds thereof.

15. The secondary battery according to claim 14, wherein the binder constitutes from 1% to 10% by mass of the negative electrode film.

16. The secondary battery according to claim 1, wherein the negative electrode film further comprises a conductive agent that comprises one or more of conductive black (SuperP) and carbon nano tube (CNT).

17. The secondary battery according to claim 16, wherein the conductive agent constitutes from 1% to 5% by mass of the negative electrode film.

18. A battery module, comprising the secondary battery according to claim 1.

19. An apparatus, comprising at least one of the secondary battery according to claim 1.

* * * * *